(12) United States Patent
Callahan et al.

(10) Patent No.: US 9,739,352 B2
(45) Date of Patent: Aug. 22, 2017

(54) DRIVE SYSTEM WITH COUPLER ASSEMBLY AND METHOD

(75) Inventors: Shawn Michael Callahan, Seattle, WA (US); Richard Bernard Hageman, III, Louisville, KY (US); Ashley Owen Hetz, Charlestown, IN (US)

(73) Assignee: Flow International Corporation, Kent, WA (US)

( * ) Notice: Subject to any disclaimer, the term of this patent is extended or adjusted under 35 U.S.C. 154(b) by 1656 days.

(21) Appl. No.: 13/194,586

(22) Filed: Jul. 29, 2011

(65) Prior Publication Data

US 2013/0025386 A1  Jan. 31, 2013

(51) Int. Cl.
| | |
|---|---|
| *B26F 3/00* | (2006.01) |
| *F16H 19/04* | (2006.01) |
| *F16H 57/022* | (2012.01) |
| *F16H 57/02* | (2012.01) |
| *F16B 1/00* | (2006.01) |

(52) U.S. Cl.
CPC ............. *F16H 19/04* (2013.01); *B26F 3/004* (2013.01); *F16H 19/043* (2013.01); *F16B 1/005* (2013.01); *F16B 1/0057* (2013.01); *F16H 2057/02021* (2013.01); *F16H 2057/0225* (2013.01); *Y10T 29/49464* (2015.01); *Y10T 74/18568* (2015.01); *Y10T 403/648* (2015.01)

(58) Field of Classification Search
CPC .......... F16H 19/04; F16H 1/24; F16H 19/043; F16H 2019/046; F16H 57/022; F16H 57/12; F16H 2057/02021; F16H 2057/0221; F16H 2057/0222; F16H 2057/0225; F16H 2057/125; F16D 3/74; Y10T 29/49464; Y10T 74/18568; Y10T 403/338; Y10T 74/18104; Y10T 74/1956; Y10T 74/19565; Y10T 74/1957; Y10T 74/1959; Y10T 74/19656; Y10T 74/19828; F16B 1/005; F16B 1/0057; B62D 3/12; B62D 3/123; B62D 3/126; B26F 3/004
USPC ............. 74/396, 397, 401, 415, 395, 31, 89; 29/893.1; 403/338
See application file for complete search history.

(56) References Cited

U.S. PATENT DOCUMENTS

| | | | |
|---|---|---|---|
| 3,693,395 A * | 9/1972 | Greven | 72/287 |
| 3,828,622 A * | 8/1974 | Neff | 74/409 |
| 3,927,899 A | 12/1975 | Bough | 280/775 |
| 3,951,002 A | 4/1976 | Gilardi | 74/29 |

(Continued)

FOREIGN PATENT DOCUMENTS

| | | |
|---|---|---|
| DE | 10 2004 008 505 | 9/2005 |
| WO | 01/88398 | 11/2001 |

*Primary Examiner* — Clark F Dexter
(74) *Attorney, Agent, or Firm* — Seed IP Law Group LLP (57) ABSTRACT

A coupler assembly is provided for coupling components in a power transmission system, such as a rack and pinion drive system. The coupler assembly includes a floating mount and a pair of clamp members movable between an unfastened configuration in which the floating mount is adjustably supported between the clamp members and a fastened configuration in which the floating mount is fixedly secured between the clamp members. At least a pitch and a yaw of the floating mount are adjustable when the clamp members are in the unfastened configuration. Methods and systems which relate to or include the aforementioned coupler assembly are also provided.

29 Claims, 8 Drawing Sheets

(56) References Cited

U.S. PATENT DOCUMENTS

| | | | |
|---|---|---|---|
| 4,273,461 A * | 6/1981 | Kjellstrand et al. | B60N 2/39 403/123 |
| 4,724,714 A * | 2/1988 | Iwasaki et al. | 74/396 |
| 5,195,707 A * | 3/1993 | Ignatuk et al. | F16M 11/12 248/179.1 |
| 5,643,058 A | 7/1997 | Erichsen et al. | 451/99 |
| 5,825,652 A * | 10/1998 | LeBlond et al. | 700/132 |
| 5,988,977 A * | 11/1999 | Gallagher et al. | 415/208.3 |
| 6,186,019 B1 | 2/2001 | Hagedorn et al. | 74/411 |
| 7,241,069 B2 * | 7/2007 | Richter | F16C 11/0661 248/288.31 |
| 7,669,341 B1 * | 3/2010 | Carazo | G01C 15/02 248/288.31 |

* cited by examiner

DRIVE SYSTEM WITH COUPLER ASSEMBLY AND METHOD

BACKGROUND

Technical Field

This disclosure relates to a coupler assembly and method to facilitate alignment of components in power transmission systems, and in some embodiments, is directed to a coupler assembly and method to facilitate meshing of a rack and pinion for high precision and efficient movement of driven components.

Description of the Related Art

High-pressure fluid jets, including high-pressure abrasive waterjets, are used to cut a wide variety of materials in many different industries. Systems for generating high-pressure abrasive waterjets are currently available, such as, for example, the Mach 4™ 5 axis abrasive waterjet system manufactured by Flow International Corporation, the assignee of the present invention. Other examples of abrasive waterjet cutting systems are shown and described in Flow's U.S. Pat. No. 5,643,058, which is incorporated herein by reference. In such systems, high-pressure fluid, typically water, flows through an orifice in a cutting head to form a high-pressure jet, into which abrasive particles are combined as the jet flows through a mixing tube. The high-pressure abrasive waterjet is discharged from the mixing tube and directed toward a workpiece to cut the workpiece along a designated path.

To enable cutting along a designated path, waterjet cutting systems include various motor driven components to move and orient a cutting head in a selected manner. For example, many systems include a bridge assembly that translates along one axis and which supports a tool carriage that is movable along a transverse axis such that cutting head is moveable with respect to an x-y plane. The tool carriage may further enable the cutting head to translate in an axis perpendicular to the x-y plane, as well as include an articulated wrist to adjust an orientation of the cutting head relative to the workpiece.

Translational movement along certain axes can be accomplished via rack and pinion drive systems in which a rotatable pinion meshes with teeth on a linear rack to convert, rotational motion of a motor (e.g., electric rotary motor) to linear motion in a direction parallel to the rack. While systems are typically designed such that the pinion meshes with the rack in an ideal manner, the stack up of machining tolerances and other assembly constraints inevitably introduce variations in mating components which results in misalignment (whether slight or otherwise). Misalignment of the rack and pinion can lead to premature wear and inaccuracies in processed workpieces. In addition, misalignment of the rack and pinion can create excessive noise during operation. To address this problem, shims may be used during assembly between mating components to improve meshing accuracy; however, shimming is a tedious trial by error process that can be prone to error and difficult to repeat consistently.

BRIEF SUMMARY

Embodiments described herein provide systems and methods for improving the alignment of components in power transmission systems, such as, for example, the meshing of a rack and pinion of a drive system. The systems and methods relate to or include a coupler assembly which can be selectively unfastened and refastened to enable spatial adjustment of one component of a power transmission system relative to another component.

In one embodiment, a coupling system may be summarized as including a floating mount and a pair of clamp members movable between an unfastened configuration in which the floating mount is adjustably supported between the clamp members and a fastened configuration in which the floating mount is fixedly secured between the clamp members. At least a pitch and a yaw of the floating mount are adjustable when the clamp members are in the unfastened configuration. The floating mount may include a flange protruding from at least a portion of a periphery thereof and a central bore. The flange of the floating mount may be sandwiched between the pair of clamp members insecurely when the clamp members are in the unfastened configuration and sandwiched between the pair of clamp members securely when the clamp members are in the fastened configuration.

The coupling system may be for a drive system in which the floating mount is configured to support a drive component (e.g., a pinion) of the drive system and assist in aligning the drive component for operation. When the clamp members are in the unfastened configuration during assembly of the drive system, the drive component which is supported by the floating mount may be selectively movable with respect to at least two degrees of freedom.

The coupling system may include a rotatable shaft coupled to the floating mount and extending through the central bore, a pinion secured to the rotatable shaft, and a rack configured to mesh with the pinion. When the clamp members are in the unfastened configuration, the pinion may be adjustably supported to have at least two degrees of angular freedom to optimize meshing alignment of teeth of the pinion with the rack. A component may be driven by an interaction of the rack and the pinion. The floating mount and the clamp members may be coupled to the component and configured such that the floating mount and clamp members are selectively adjustable to mesh the pinion with the rack. The driven component may be, for example, a portion of a movable bridge assembly having a machine tool attached thereto that is drivable with respect to a workpiece support surface by the interaction of the rack and pinion.

In some embodiments, the pitch and the yaw of the floating mount may each be adjustable by at least ±5 degrees from a reference axis (corresponding to a central axis of the pinion in an initial centered position) when the pair of clamp members are in the unfastened configuration. The clamp members may loosely engage the floating mount when in the unfastened configuration to impart some frictional resistance when adjusting the pitch or the yaw of the floating mount. The pitch and the yaw of the pinion may be configured to adjust relative to the rack specifically in response to the meshing of the rack and pinion.

A flange of the floating mount may have a convex mating surface and an opposing concave mating surface for interoperating with correspondingly shaped surfaces of the clamp members. The convex mating surface and the opposing concave mating surface of the floating mount may interoperate with the clamp members when in the unfastened configuration to form a manipulable joint having partial spherical mating surfaces. The convex mating surface and the opposing concave mating surface of the floating mount may each include a partial spherical surface in which a center of a sphere defining the partial spherical surface is aligned with a central axis of the floating mount and located approximately at a center of an engagement length of teeth of the pinion.

According to another embodiment, a drive assembly may be summarized as including a rack, a pinion, a component driven by an interaction of the rack and the pinion, and a coupler assembly between the pinion and the component to provide spatial adjustment of the pinion with respect to the rack. The coupler assembly includes a floating mount and a pair of clamp members movable between an unfastened configuration in which the floating mount is adjustably supported between the clamp members and a fastened configuration in which the floating mount is fixedly secured between the clamp members. At least a pitch and a yaw of the floating mount are adjustable when the clamp members are in the unfastened configuration to optimize meshing alignment of the pinion with the rack. The component driven by the interaction of the rack and the pinion may be a portion of a bridge assembly having a machine tool attached thereto such that the bridge assembly and machine tool are linearly movable with respect to a workpiece support surface. The machine tool may be a cutting head of a waterjet cutting machine.

According to another embodiment, a method of meshing a rack and a pinion may include: coupling the pinion to a floating mount; clamping the floating mount insecurely between a pair of clamp members such that at least a pitch and a yaw of the floating mount are adjustable; urging the pinion into meshing alignment with the rack while the floating mount is clamped insecurely between the clamping members; and while maintaining the pinion in contact with the rack, clamping the floating mount securely between the pair of clamp members such that an alignment of the pinion is fixedly secured relative to an alignment of the rack. The method may further include, prior to urging the pinion into meshing alignment with the rack, attaching a counterbalance to the pinion. Attaching a counterbalance to the pinion may include shifting a fulcrum of an assembly supported by the pinion to substantially align with the rack. Urging the pinion into meshing alignment with the rack may include urging the pinion into meshing alignment with the rack via a ram. Clamping the floating mount insecurely between a pair of clamp members may include supporting a flange protruding from at least a portion of a periphery of the floating mount loosely between the clamp members. Clamping the floating mount securely between the pair of clamp members may include tightening a plurality of fasteners to draw the clamp members tightly against the floating mount. The method may further include adjusting an amount of preload between the pinion and the rack. The method may further include providing the rack and the pinion to drive a movable bridge of a multi-axis machine and adjusting an amount of preload between the pinion and the rack to optimize an accuracy with which an end effector of the multi-axis machine is manipulated in space by the movable bridge. Adjusting the amount of preload between the pinion and the rack may include establishing an initial amount of preload, testing the accuracy with which the end effector of the multi-axis machine is manipulated in space by the movable bridge and adjusting the amount of preload based at least in part on results of the testing.

DETAILED DESCRIPTION

In the following description, certain specific details are set forth in order to provide a thorough understanding of various disclosed embodiments. However, one of ordinary skill in the relevant art will recognize that embodiments may be practiced without one or more of these specific details. In other instances, well-known structures associated with power transmission systems, including rack and pinion drive systems, may not be shown or described in detail to avoid unnecessarily obscuring descriptions of the embodiments. For instance, fasteners for attaching various components together have not been illustrated; however, it will be apparent to those of ordinary skill in the art that conventional fasteners, including threaded bolts, of appropriate size and grade may be used to join such components. In addition, it will be appreciated by those of ordinary skill in the relevant art that a variety of materials may be used for the various components described herein, such as, for example, metals, plastics and composites of different strengths and other material properties, based on numerous design factors including, for example, operating and loading conditions. Still further, various components described herein may be made using a variety of conventional manufacturing techniques, such as, for example, machining, casting, molding, etc.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide systems and methods for improving the alignment of components in power transmission systems, such as, for example, improving the meshing of a rack and pinion drive system. The systems and methods relate to or include a coupler assembly which can be selectively fastened and unfastened to enable adjustment of one component of a power transmission system relative to another. Example embodiments include a coupling system for power transmission components of a multi-axis waterjet cutting system, and in particular, a coupling system including a floating mount in which at least a pitch and a yaw of the floating mount may be adjusted to mesh a pinion attached thereto to a rack. In accordance with such embodiments, translational movement of components of the waterjet cutting system (e.g., a movable bridge) may be performed with high precision and in a manner that prolongs the service life of the drive components (e.g., the rack and pinion). The capabilities of the coupling system and related methods further enable assembly of drive systems of the waterjet cutting system in a particularly efficient and repeatable manner.

Figure 1:
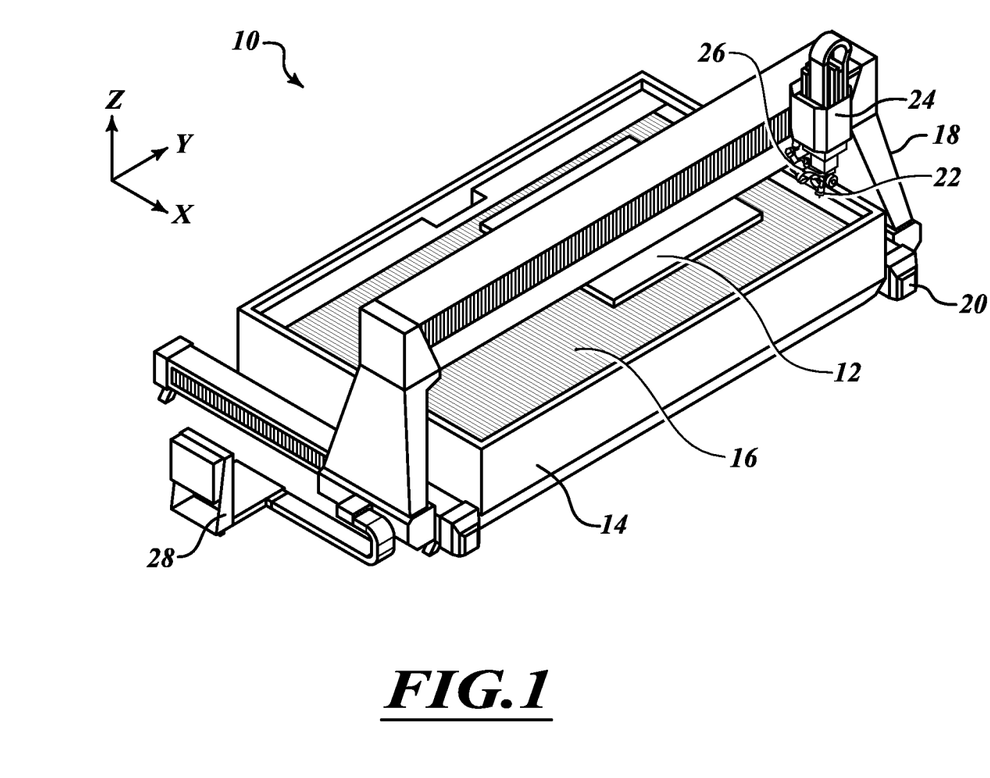
FIG. 1 is an isometric view of a waterjet cutting system having a bridge assembly movable along a pair of base rails.

FIG. 1 shows a waterjet cutting system 10 which includes at least one coupler assembly 42 (FIGS. 2 through 5 and 8) for connecting power transmission components of the waterjet cutting system 10 together. The coupler assembly 42 enables high precision connection of the components such that the waterjet cutting system 10 may process a workpiece 12 in a particularly accurate and quiet manner.

The example waterjet cutting system 10 includes a catcher tank 14 and workpiece support structure 16 for supporting the workpiece 12 to be processed. The waterjet cutting system 10 further includes a bridge assembly 18 which is movable along a pair of base rails 20. In operation, the bridge assembly 18 moves back and forth along the base rails 20 with respect to a translational axis X to position a cutting head 22 for processing the workpiece 12. A tool carriage 24 is movably coupled to the bridge assembly 18 to translate back and forth along another translational axis Y, which is aligned perpendicularly to the translational axis X. The tool carriage 24 is further configured to raise and lower the cutting head 22 along yet another translational axis Z for moving the cutting head 22 toward and away from the workpiece 12. An articulated wrist 26 is provided to adjust an orientation of the cutting head 22 relative to the workpiece 12 to enable processing of the workpiece 12 along particularly complex tool paths. During operation, movement of the cutting head 22 with respect to each of the translational axes X, Y, Z may be accomplished via respective rack and pinion drive systems and an appropriate control system 28.

Figure 2:
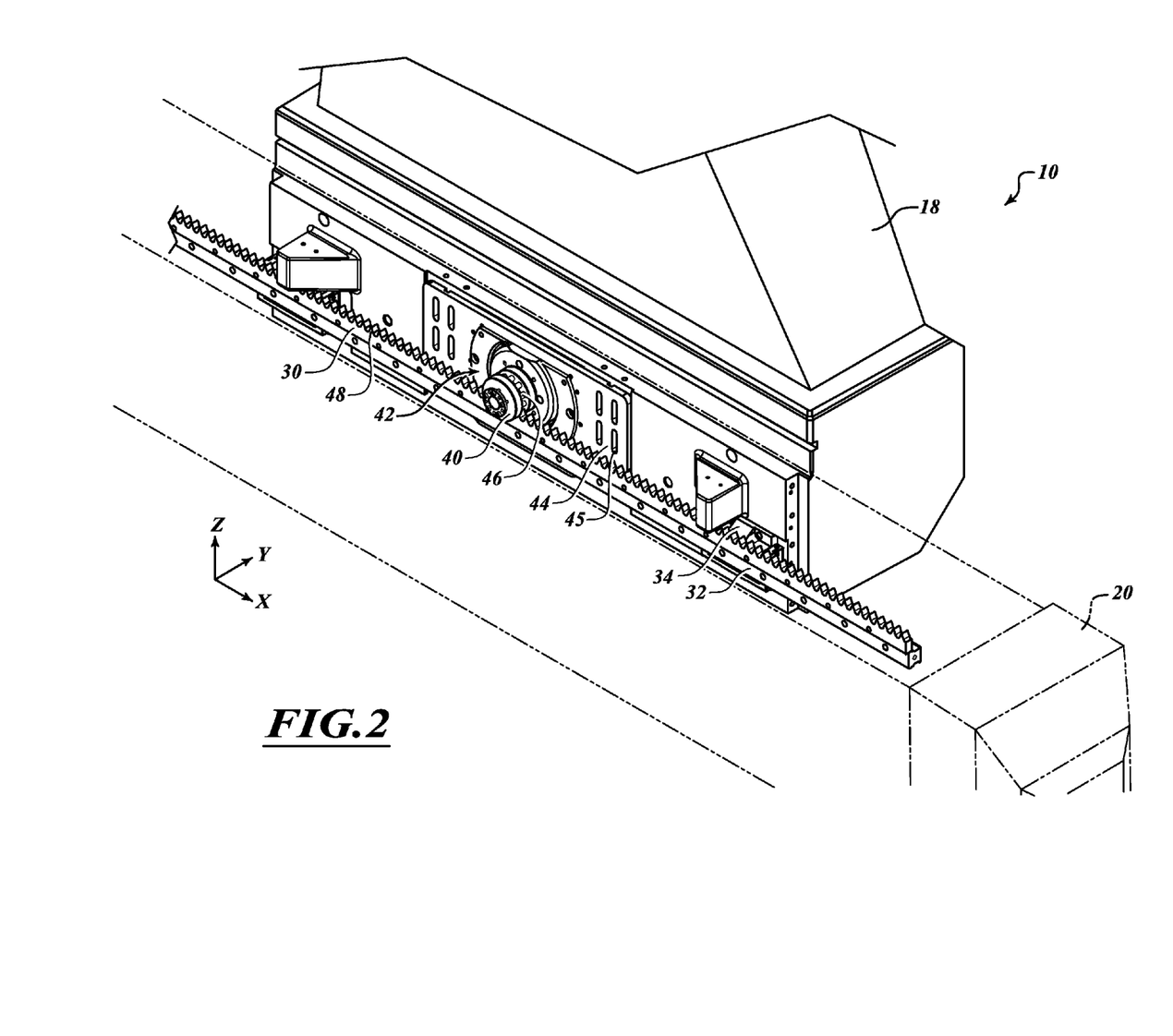
FIG. 2 is a partial isometric view of a portion of the waterjet cutting system of FIG. 1 with the base rail shown in phantom to reveal a rack and pinion drive system including a coupler assembly, according to one embodiment.

For instance, with reference to FIG. 2, the bridge assembly 18 of the example waterjet cutting system 10 is shown coupled to a rack 30 fixedly secured to one of the base rails 20 (shown in phantom). The rack 30 may be fixedly attached to the base rail 20 by a plurality of fasteners, for example, that extend along a longitudinal length thereof. The base rail 20 may further include a guide rail 32 fixedly attached thereto for sliding engagement by one or more correspondingly shaped guides blocks 34 carried by the bridge assembly 18. A rotatable motor-driven pinion 40 is meshed with the rack 30 for driving the bridge assembly 18 fore and aft along the longitudinal length of the rack 30 parallel to the translational axis X. In this manner, the bridge assembly 18 can slide back and forth along the guide rail 32 in response to the interaction of the rack 30 and pinion 40. To facilitate accurate processing of workpieces, enhance component life and reduce operational noise, the rack 30 and pinion 40 are meshed together in a particularly precise manner.

To enable precise meshing, the pinion 40 is coupled to the bridge assembly 18 via the coupler assembly 42 and an intermediate mounting plate 44. As is common of rack and pinion drive systems, the pinion 40 includes a number of teeth 46 which are sized and spaced to interoperate with correspondingly shaped teeth 48 spaced along the longitudinal length of the rack 30. The teeth 46 of the pinion 40 may be cylindrical pins, as shown, or other conventional gear tooth structures.

Figure 3:
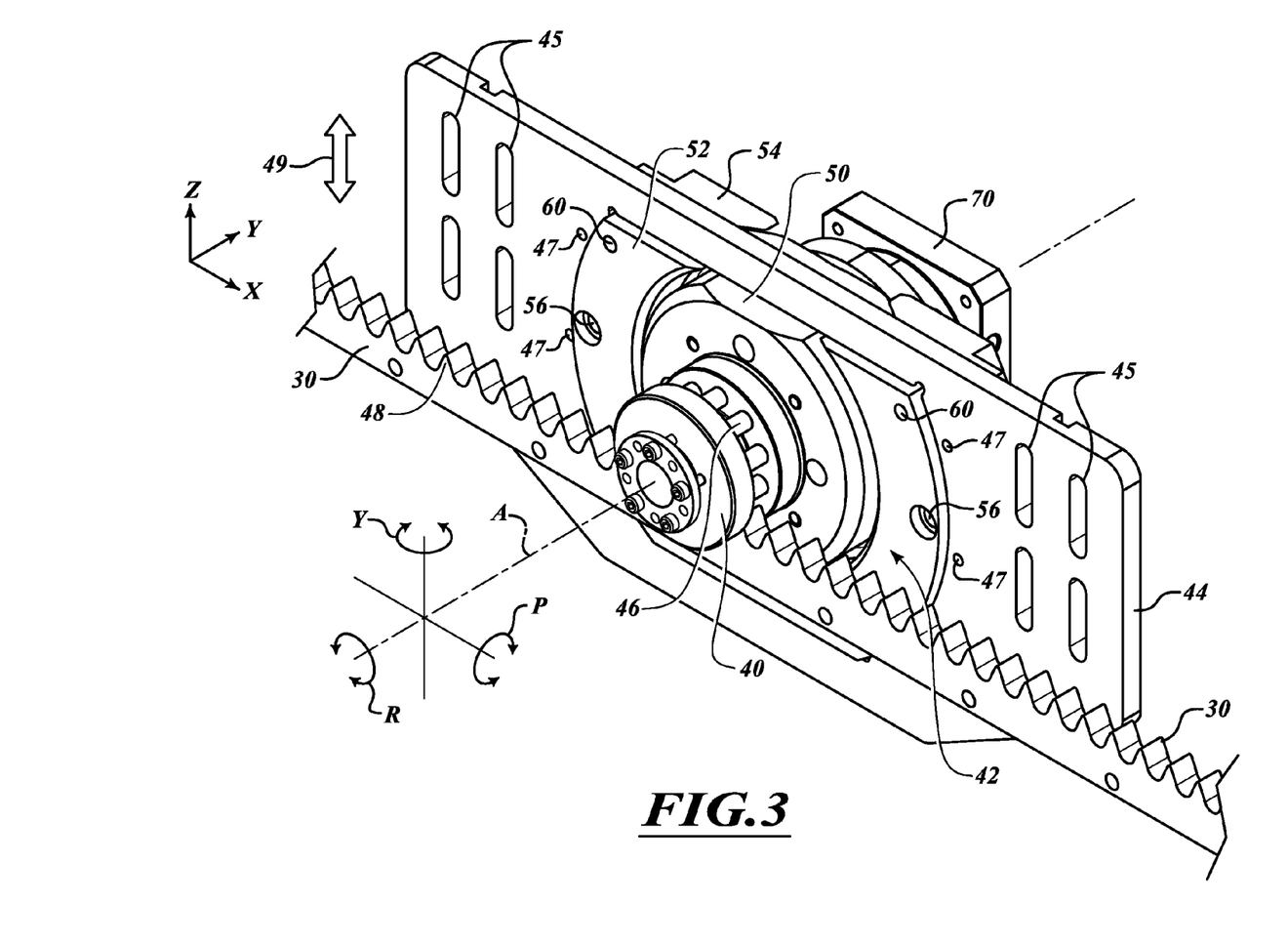
FIG. 3 is an isometric detail view of the rack and pinion drive system of FIG. 2.

Further details of the coupler assembly 42 and intermediate mounting plate 44 are described with reference to FIG. 3. The mounting plate 44 includes a plurality of slots 45 to enable vertical adjustment of the mounting plate 44 and pinion 40 relative to the bridge assembly 18. Threaded fasteners (not shown) may be received through the slots 45 and passed through corresponding threaded holes or through holes (not shown) on the bridge assembly 18. In one embodiment, the coupler assembly 42 is attached to the mounting plate 44 with fasteners (not shown) via mounting holes 47 of the mounting plate 44 and corresponding mounting holes 43 (FIG. 4) of the coupler assembly 42. The mounting holes 43, 47 of the mounting plate 44 and coupler assembly 42 may be through holes with fasteners secured therethrough with threaded nuts, or, in some embodiments, some of the holes 43, 47 may be threaded to mate with the threaded fasteners. In other embodiments, other fastening devices or mechanisms may be used in lieu of threaded fasteners to join the mounting plate 44 and coupler assembly 42, such as, for example, a projection on the coupler assembly 42 engaging a channel on the mounting plate 44 and being secured therein with a spring-biased locating pin. In still other embodiments, the coupler assembly 42 may be welded or otherwise permanently fixed to the mounting plate 44. In any event, upon assembly, the coupler assembly 42 and the mounting plate 44 are fixedly secured together. Accordingly, the coupler assembly 42 and mounting plate 44 can move together toward and away from the rack 30 to move the pinion 40 into and out of meshing contact with the rack 30, as represented by the arrows labeled 49. In some embodiments, the coupler assembly 42 and mounting plate 44 may be configured to move in a direction perpendicular or substantially perpendicular to a reference axis corresponding to the central axis A of the pinion 40 in an initial centered position and perpendicular or substantially perpendicular to a longitudinal length of the rack 30.

In some embodiments, a component of the coupler assembly 42 may include a slotted flange that is configured to interface with the bridge 18 (or any other component to be driven) directly without an intermediate mounting plate 44 positioned between the bridge 18 and the coupler assembly 42. In such embodiments, the coupler assembly 42 may slide or otherwise translate linearly in the elongated direction of the slots toward and away from the rack 30 to move the pinion 40 into and out of meshing contact with the rack 30.

Figure 4:
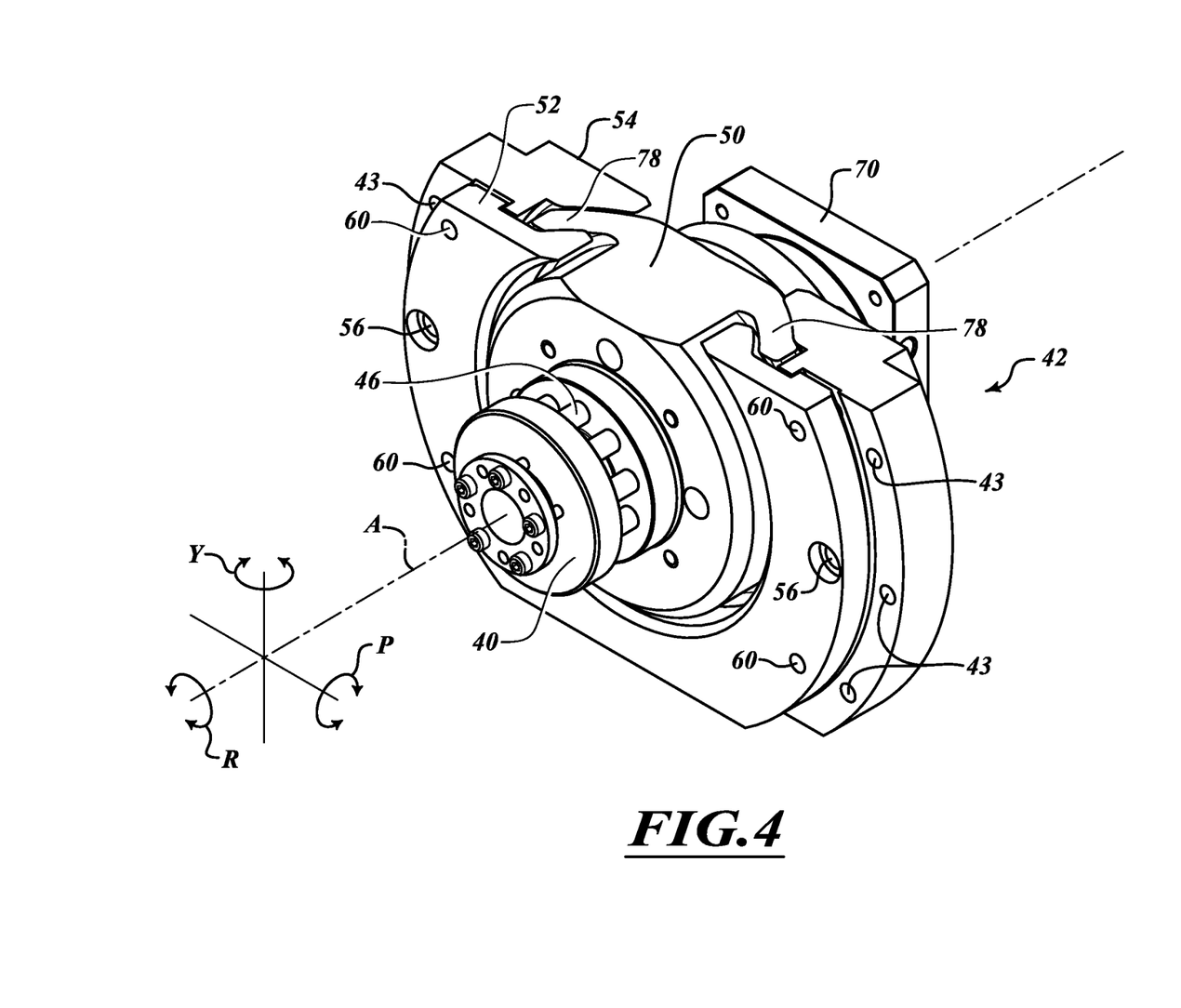
FIG. 4 is an isometric detail view of the coupler assembly of FIG. 2 with a pinion and a motor mount of the rack and pinion drive system.

With reference to FIG. 4, the coupler assembly 42 includes a floating mount 50 sandwiched between a pair of clamp members 52, 54. The clamp members 52, 54 are movable between an unfastened configuration in which the floating mount 50 is adjustably supported between the clamp members 52, 54 and a fastened configuration in which the floating mount 50 is fixedly secured in a selected position between the clamp members 52, 54. In some embodiments, this can be accomplished by loosening and tightening conventional threaded fasteners 55 which extend through holes 56 of one of the clamp members 52 and engage threaded holes 58 (FIG. 5) of the other clamp member 54. Of course, in some embodiments, it will be appreciated that the fasteners could also extend through holes in the other clamp member 54 and be secured thereto with a threaded nut; however, the use of threaded holes 58 (FIG. 5) advantageously enables tightening and loosening of the fasteners from a single side of the coupler assembly 42. Accordingly, the coupler assembly 42 may transition quickly and efficiently between the fastened and unfastened configurations. Other fasteners or guide pins may be received in supplementary holes 60, 61 for maintaining alignment of the clamp members 52, 54 and/or preventing the clamp members 52, 54 from separating completely when the clamp members 52, 54 are move to the unfastened configuration.

In other embodiments, other fastening devices or mechanisms, such as, for example, toggle clamps or other adjustable clamping devices, may be provided in lieu of threaded fasteners to selectively transition the clamp members 52, 54 between the unfastened and fastened configurations to enable and disable the spatial adjustability of the floating mount 50, respectively.

Irrespective of the fastening mechanism, when the clamp members 52, 54 are in the unfastened configuration, at least a pitch and a yaw of the floating mount 50 are adjustable, as represented by the arrows labeled P and Y, respectively, in FIG. 4. A roll of the floating mount 50 may also be adjustable, as represented by the arrow labeled R. This enables the pinion 40, which is rotatably coupled to the floating mount 50, to be adjusted with respect to multiple degrees of freedom when meshing with the rack 30. The pinion 40 is further coupled to a motor mount 70 for transmitting mechanical power directly or indirectly from a motor (not shown) to the pinion 40.

Further details of the coupler assembly 42 are described with reference to FIG. 5, which illustrates the pinion 40, coupler assembly 42 and the motor mount 70 in an exploded view. When assembled, the pinion 40 may be coupled to a rotatable shaft 72 protruding from the motor mount 70 in any conventional way of securing rotational components to a shaft, such as, for example, via a pinion shaft lock bolt. The motor mount 70 is in turn directly or indirectly coupled to a motor (not shown) such that the motor is able to selectively rotate the shaft 72 in either rotational direction (i.e., clockwise and counterclockwise). In some embodiments, a motor (e.g., rotary electric motor) may be coupled directly to the motor mount 70, or in other embodiments, a gearbox or other conventional power transmission components may be coupled between the motor and the motor mount 70. The motor and any intermediate components can be suspended from the floating mount 50 and electrically tethered to the control system 28 for selectively driving the pinion 40 in response to instructions for moving the bridge assembly 18 of the waterjet cutting system 10.

The motor mount 70 may be fixedly secured to the floating mount 50 upon assembly with fasteners via mounting holes 74 of the floating mount 50 and corresponding mounting holes 76 on the motor mount 70 or in any other available way. The motor mount 70 is secured to the floating mount 50 such that the rotatable shaft 72 is received and passes through the central bore 79 of the floating mount 50. The pinion 40, which is rotatably supported by the motor mount 70 as described above, is thus securely attached to the floating mount 50 and projects outwardly from the same. In this manner, the pinion 40 is provided beyond an end of the coupling assembly 42 for mating engagement with the rack 30. Advantageously, the spatial orientation of a central rotational axis A about which the pinion 40 rotates can therefore be controlled by the orientation of the floating mount 50 which is sandwiched between the clamp members 52, 54. Adjusting a spatial orientation of the floating mount 50 necessarily adjusts the spatial orientation of the pinion 40 with respect to the clamp members 52, 54 and other components mated thereto, and vice versa.

In one embodiment, the floating mount 50 includes a flange 78 protruding from a periphery thereof and the central bore 79 extending through the floating mount 50 to accommodate at least the rotatable shaft 72 of the motor mount 70. The flange 78 may extend around a substantial portion of the periphery of the floating mount 50, as shown in FIG. 5, or, in other embodiments, may extend completely around the periphery of the floating mount 50. In still other embodiments, the flange 78 may comprise intermittingly spaced flange portions around the periphery, such as, for example, opposing flange portions located at the three o'clock and nine o'clock positions. In some embodiments, the flange 78 may protrude from a majority of the periphery of the floating mount 50. Alternatively, the flange 78 may protrude from a minority of the periphery of the floating mount 50. In any event, the flange 78 is sized and shaped to be received between correspondingly shaped portions of the clamp members 52, 54 so that the floating mount 50 and the clamp members 52, 54 nest together.

More particularly, the flange 78 of the floating mount 50 includes opposing bearing surfaces 80, 82 for interoperating with correspondingly shaped surfaces 84, 86 of the clamp members 52, 54. One bearing surface 80 of the flange 78 of the floating mount 50 may be a concave surface representing a portion of a sphere and the correspondingly shaped surface 84 of the clamp member 52 may be convex and vary insubstantially from the partial spherical shape of the bearing surface 80. The opposing bearing surface 82 may be a convex surface representing a portion of another sphere and the correspondingly shaped surface 86 of the clamp member 54 may be concave and vary insubstantially from the partial spherical shape of the bearing surface 82. In this manner, the floating mount 50 rides between the clamp members 52, 54 to form a manipulable spherical-like joint in which a pitch, yaw and roll of the floating mount 50 can be adjusted relative to the clamp members 52, 54 when the clamp members 52, 54 are in the unfastened configuration.

Figure 5:
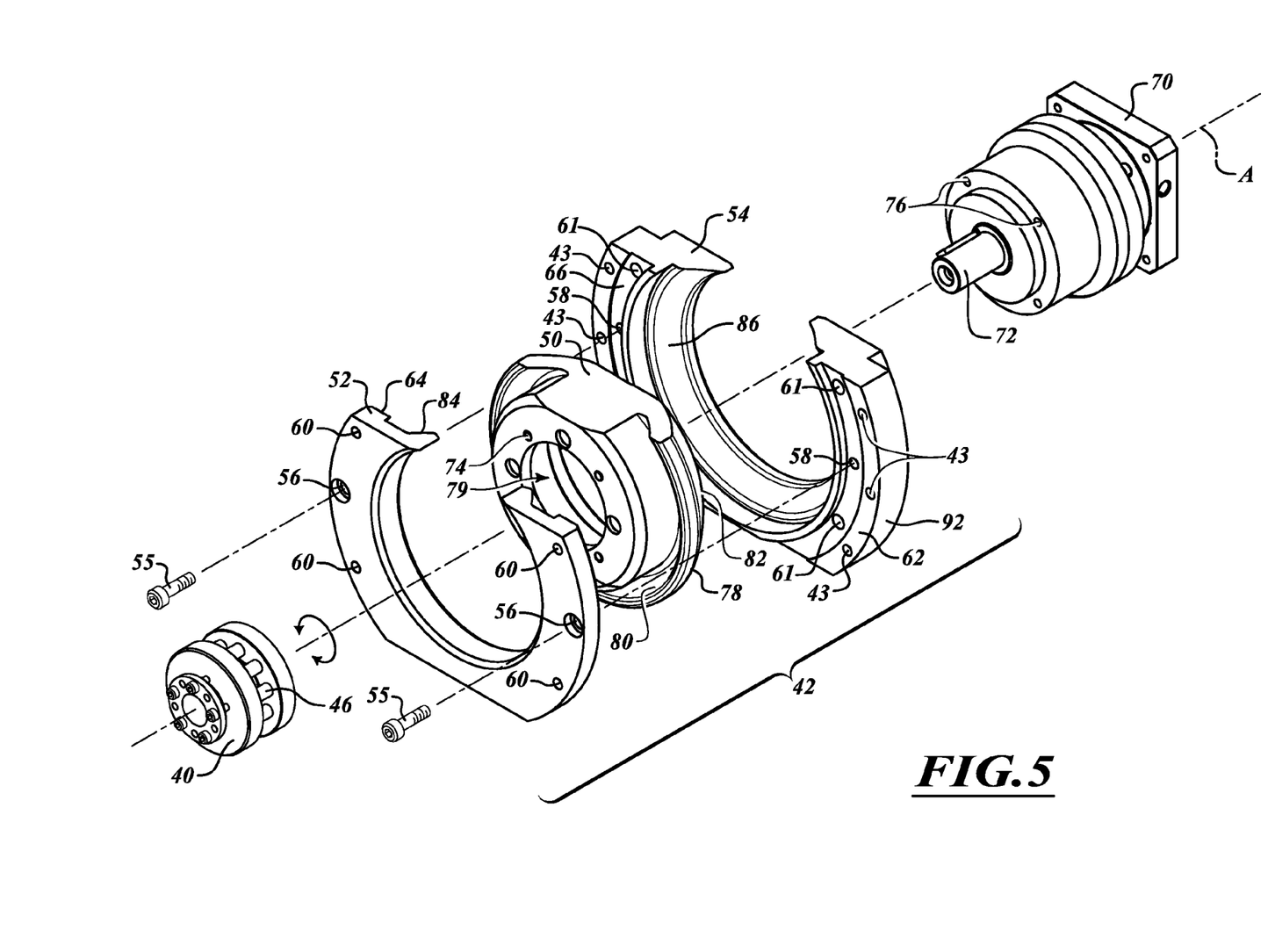
FIG. 5 is an isometric exploded view of the coupler assembly of FIG. 2 with the pinion and the motor mount of the rack and pinion drive system.

As can be appreciated from FIG. 5, each of the clamp members 52, 54 may be generally planar and horseshoe shaped and include a central void to receive at least a portion of the floating mount 50. Many other shapes are contemplated, however, including, for example, complete ring-shaped clamp members 52, 54. Each of the holes 56, 58, 60, 61 for coupling the clamp members 52, 54 together may be spaced concentrically about a center of each respective clamp member 52, 54. An additional flange portion 62 may be provided on one of the clamp members 54 for accommodating the holes 43 for attaching the clamp assembly 42 to the mounting plate 44 (FIG. 3). The clamp members 52, 54 may further include one or more projections 64 and correspondingly shaped grooves or cavities 66 for nesting the clamp members 52, 54 together and optionally providing one or more stops to assist in controlling the clamping force that may be imparted on the floating mount 50 when the clamp members 52, 54 transition from the unfastened configuration to the fastened configuration. Whether in the fastened or unfastened configuration, the floating mount 50 is preferably received entirely within the outermost profile of each of the clamp members 52, 54 when viewing the floating mount 50 along the central axis A.

Further details of the clamp members 52, 54 and the floating mount 50 and the manner of nesting the same can be appreciated by studying the figures. For example, the bearing surface 80 of the floating mount 50 and the correspondingly shaped surface 84 of the clamp member 52 may each comprise a relatively small portion or sliver of a spherical surface, such as, for example, the bearing surface 80 and correspondingly shaped surface 84 each having a surface area less than twenty-five percent, less than ten percent, or less than five percent of the surface area of the spherical surface. Similarly, the bearing surface 82 of the floating mount 50 and the correspondingly shaped surface 86 of the clamp member 54 may comprise a relatively small portion or sliver of a spherical surface, such as, for example, the bearing surface 82 and correspondingly shaped surface 86 each having a surface area less than twenty-five percent, less than ten percent, or less than five percent of the surface area of the spherical surface. In this manner, the mating flange 78 of the floating mount 50 and correspondingly shaped pockets of the clamp members 52, 54 may be relatively thin and the floating mount 50 and clamp members 52, 54 may be relatively planar. This advantageously enables a coupler assembly 42 to have a particularly compact form factor relative to the drive components that it supports. For instance, in some embodiments, the overall width of the coupler assembly 42 may be approximately twice the diameter of the shaft 72 that it supports or less.

As another example, as illustrated best in FIG. 4, the floating mount 50 may have an overall mushroom-like shape with a head of the mushroom-like shape corresponding to the flange 78. The clamp members 52, 54 may combine to form a central cavity which resembles the same mushroom-like shape but with sufficient clearance at the periphery of the flange 78 and at the body of the floating mount 50 to enable the floating mount 50 to adjust within the cavity when the clamp members 52, 54 are in the unfastened configuration within at least a nominal range of motion.

Figure 6:
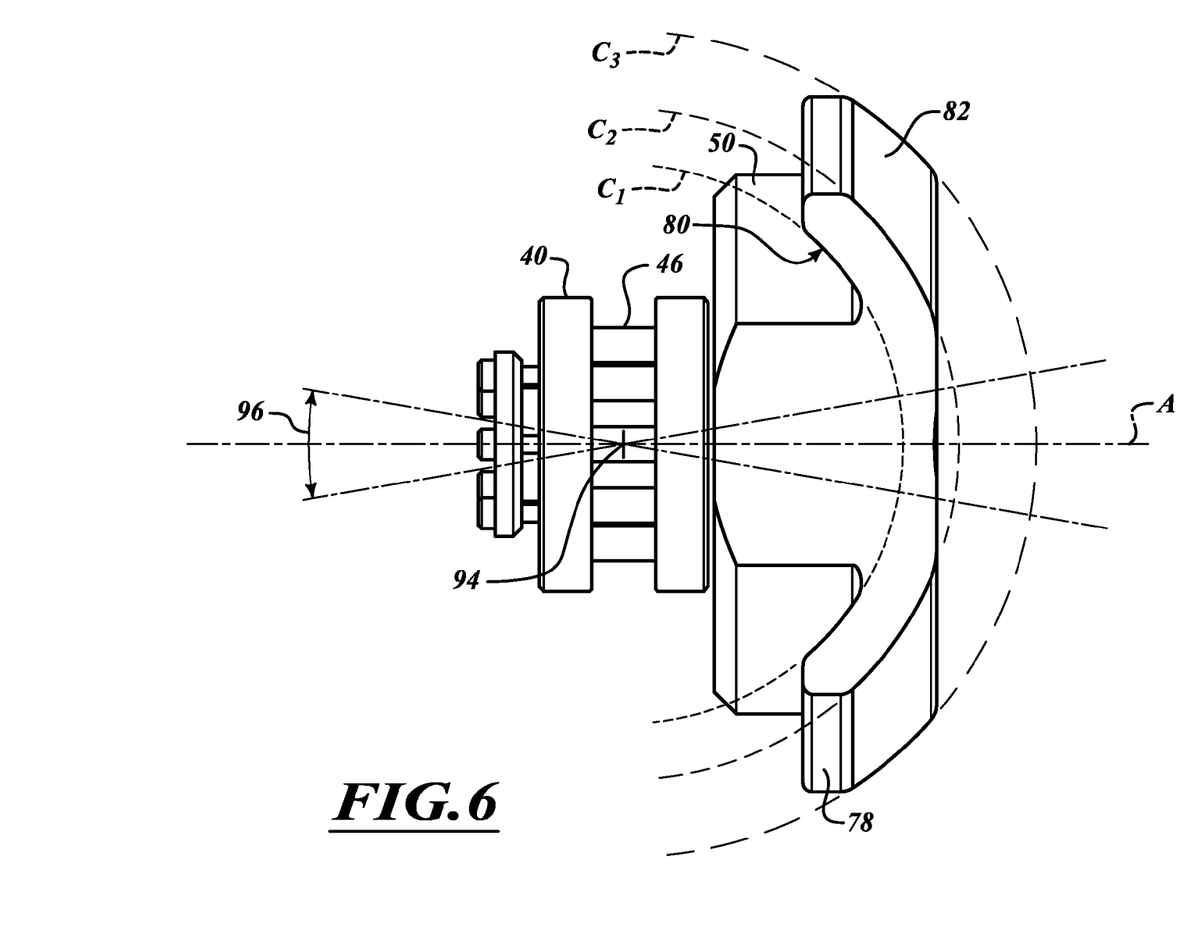
FIG. 6 is a top plan view of a floating mount of the coupler assembly of FIG. 2 and the pinion.
Figure 7:
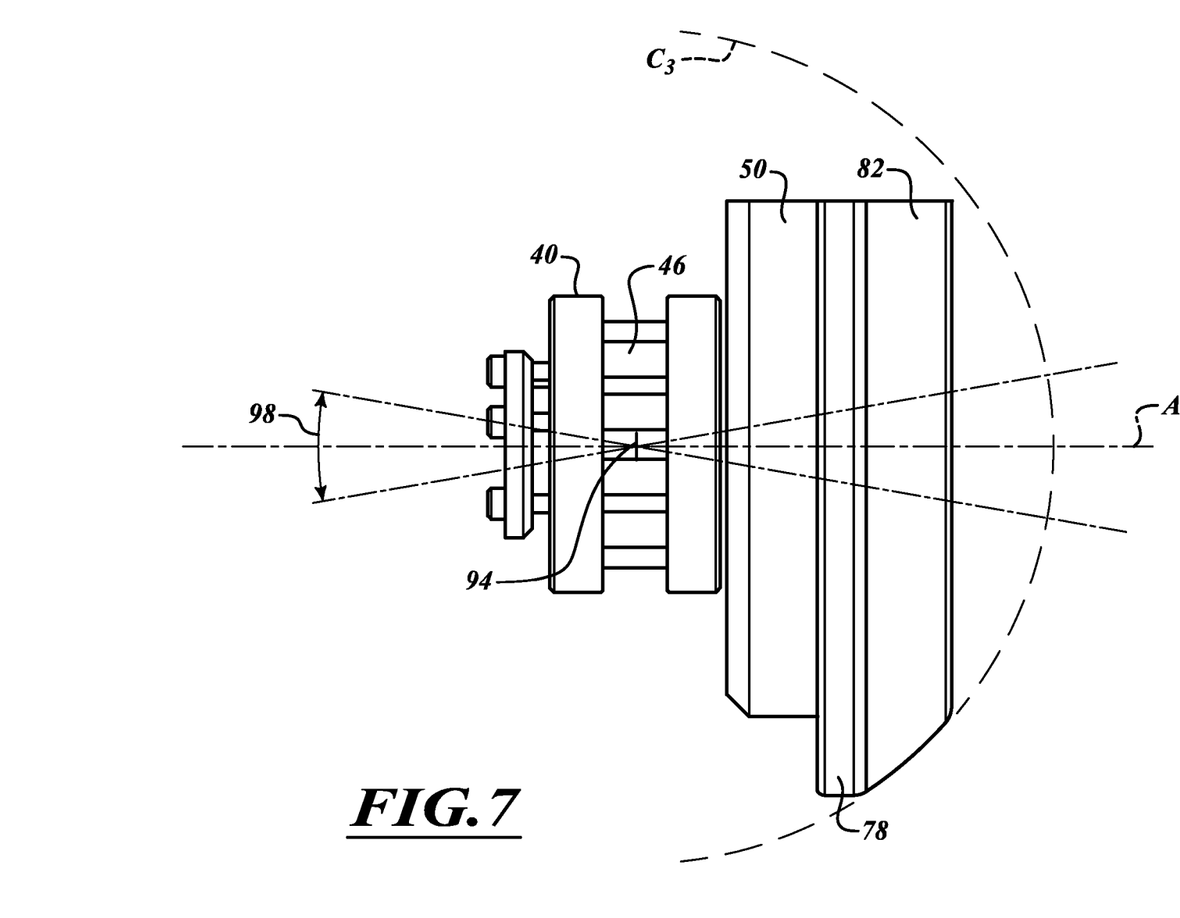
FIG. 7 is a side elevational view of the floating mount of the coupler assembly of FIG. 2 and the pinion.

The adjustability of the floating mount 50 within the clamp members 52, 54 is further illustrated in FIGS. 6 and 7. FIG. 6 shows a top view of the floating mount 50, according to one illustrated embodiment. Reference curves C1, C2, and C3 align with the opposing bearing surfaces 80, 82 of the flange 78 and illustrate the partial spherical nature of the bearing surfaces 80, 82. FIG. 7 shows a side view of the floating mount 50. Reference curve C3 aligns with the bearing surface 82 of the flange 78 and further illustrates the partial spherical nature of the bearing surface. As shown in FIGS. 6 and 7, the center 94 of the sphere defining the partial spherical surfaces of the opposing bearing surfaces 80, 82 lies along the central axis A of the pinion 40 and a plane that is approximately at the center of an engagement length of the teeth 46 of the pinion 40. In some embodiments, however, the center 94 of the sphere defining the partial spherical surfaces of the opposing bearing surfaces 80, 82 may lie along the central axis A at a position fore or aft of the position shown.

The clamp members 52, 54 combine together in the unfastened configuration to form a cavity for loosely holding or adjustably supporting the flange 78 of the floating mount 50 with clearance around the periphery thereof to allow a range of motion that is sufficient to adjust for inaccuracies in the alignment of the pinion 40 and rack 30—inaccuracies which may arise, for example, from the stack up of machining tolerances of mating components. In some embodiments, the yaw of the floating mount 50 may be adjustable within a range of motion 96 (FIG. 6) of at least ±2 degrees from a reference axis corresponding to the central axis A of the pinion 40 in an initial centered position. Similarly, the pitch of the floating mount 50 may be adjustable within a range of motion 98 (FIG. 7) of at least ±2 degrees from the reference axis corresponding to the central axis A of the pinion 40 in the initial centered position. In other embodiments, the range of motion 96 of the yaw and the range of motion 98 of the pitch of the floating mount 50 may each be greater than or equal to ±5 degrees. The roll of the floating mount 50 may also be adjustable within ranges similar to the pitch and yaw or different therefrom. The adjustability of the roll of the floating mount 50 is less beneficial because the pinion 40 is itself rotatable about the central axis A. Collectively, when the coupling assembly 42 is in the unfastened configuration, the floating mount 50 is adjustable such that, as the pinion 40 is urged into meshing contact with the rack 30, the central axis A of the floating mount aligns normal to the rack 30 irrespective of variations in the orientation or position of the rack 30 or other components from an ideal design configuration—variations which may be attributable to the stack up of machining tolerances, for example. This ensures that the pinion 40 and rack 30 mesh such that the teeth 46 of the pinion 40 sequentially contact the rack 30 with a line contact rather than a point contact.

In the unfastened configuration, the clamp members 52, 54 may grip the floating mount 50 with some frictional resistance such that at least some nominal force is required to adjust the alignment of the central axis A of the pinion 40. In some embodiments, the clamp members 52, 54 may loosely engage the floating mount 50 when in the unfastened configuration such that only a slight nominal force is required to adjust the orientation of the central axis A. In other embodiments, a more substantial force may be required. In still other embodiments, the frictional resistance between the clamp members 52, 54 and the floating mount 50 may be zero or close to zero when in the unfastened configuration. Conversely, when the clamp members 52, 54 are in the fastened configuration, the clamp members 52, 54 engage the floating mount 50 with sufficient force to resist movement of the floating mount 50 under normal operating conditions. The amount of resistive force may be selectively increased by tightening fasteners to draw the clamp members 52, 54 together tighter. In some embodiments, clamps, clasps or other fastening devices may be used in lieu of threaded fasteners to bring the clamp members 52, 54 into secure engagement with the floating mount 50.

Figure 8:
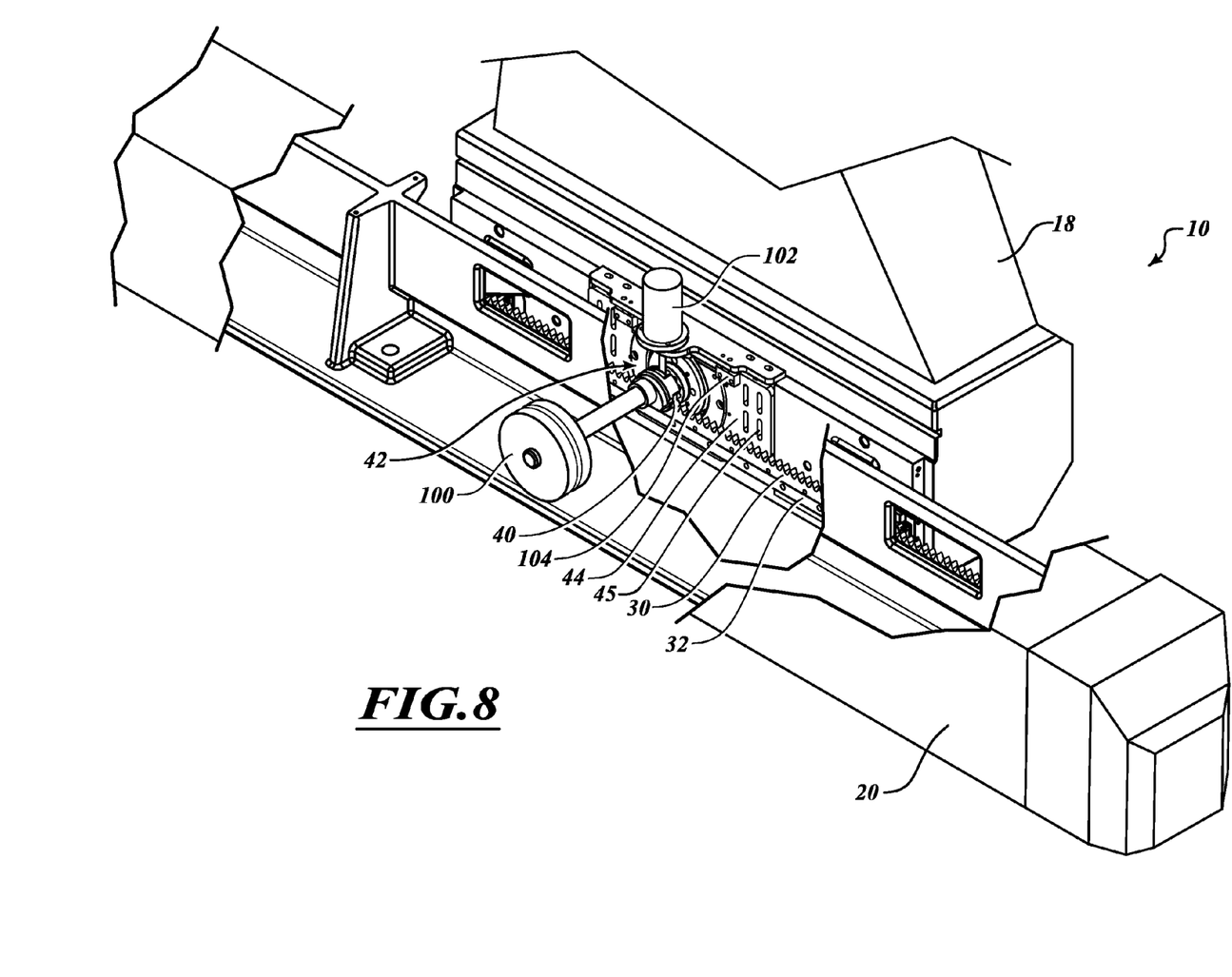
FIG. 8 is a partial isometric view of the waterjet cutting system of FIG. 1 with broken sections to reveal the rack and pinion drive system in an initial meshing configuration.

FIG. 8 shows the example waterjet cutting system 10 in an initial meshing configuration in which auxiliary devices may be used to bring the pinion 40 into meshing engagement with the rack 30. For instance, during assembly, a counterbalance 100 may be attached to the pinion 40 to substantially balance a collective weight of components supported by the floating mount 50 about the position of the rack 30. For example, in some embodiments, the counterbalance 100 may be sized to counteract a motor and a gearbox attached to the floating mount 50 and to shift a fulcrum of the supported assembly to substantially align with the rack 30. In this manner, the pinion 40 may be urged into meshing engagement with the rack 30 with a particularly high degree of precision substantially unaffected by a moment that would otherwise be created by unbalanced cantilevered components.

A ram device 102, such as a hydraulic, pneumatic or electric ram, may be temporarily or permanently attached to the bridge assembly 18 to selectively urge the pinion 40 toward the rack 30. Fasteners attaching the mounting plate 44 to the bridge assembly 18 are loose during this procedure, such that the mounting plate 44 may slide vertically relative to the bridge assembly 18 via slots 45 as the pinion 40 is urged toward the rack 30. The ram 102 may urge the pinion 40 into meshing engagement with the rack 30 with a desired amount of preloading. In some embodiments, the ram 102 may be replaced with other mechanisms for urging the pinion 40 into meshing engagement with the rack 30, such as, for example, one or more fasteners threaded into a portion of the bridge assembly 18 and abutting a portion of the pinion 40 or coupler assembly 42.

As the pinion 40 is driven into the rack 30, the alignment of the pinion 40 adjusts simultaneously in response thereto. In particular, the interaction of the rack 30 and pinion 40 causes the floating mount 50 to slide or otherwise move within the cavity defined by the clamp members 52, 54 in the unfastened configuration until the central axis A of the floating mount 50 is aligned precisely normal to the rack 30. Once the pinion 40 is properly aligned, the clamp members 52, 54 can be drawn together to securely clamp down on the floating mount 50 and fixedly secure the orientation of the floating mount 50 (and hence pinion 40) relative to the rack 30.

In some embodiments, devices or mechanisms for making additional minor adjustments to the amount of preload may be included. For instance, threaded fasteners (e.g., threaded bolts and set screws) may be positioned to selectively engage surfaces of adjustment blocks 104 attached to the intermediate mounting plate 44 and push the mounting plate 44 incrementally toward the rack 30 with rotation of the threaded fasteners. Once the desired amount of preload has been reached, the fasteners securing the intermediate mounting plate 44 to the bridge assembly 18 can be tightened to fixedly secure the mounting plate 44 to the bridge assembly 18 for operation. The counterbalance 100, ram 102, and any other temporary fixture or assembly devices can be removed before operation to prevent interference and/or reduce machine operational weight. Further steps may also be performed to ensure that all fasteners are securely tightened to the desired torque in a familiar manner prior to operation.

The amount of preload between the rack 30 and the pinion 40 may be adjusted to optimize an accuracy with which the cutting head 22 (FIG. 1) of the waterjet cutting system 10 is manipulated in space by the bridge assembly 18 and tool carriage 24 (FIG. 1). More particularly, an initial amount of preload may be established when meshing the rack 30 and the pinion 40. Then, the cutting head 22 may be manipulated in space within a circular path, for example, while taking measurements of the actual positions of the cutting head 22 relative to the expected positions as the cutting head 22 is moved parallel to the x-y reference plane. For instance, in some embodiments, a ball bar calibration tool may be mounted to the cutting head 22 or end effector of the waterjet cutting system 10 and used to gather data reflecting deviations from the expected path of the cutting head 22 as it is manipulated in space by the bridge assembly 18 and tool carriage 24. Based on the results of these measurements, the preload between the rack 30 and the pinion 40 may be increased or decreased to affect the accuracy with which the cutting head 22 may be manipulated in space. The accuracy of the system 10 may be retested under the revised preloading conditions (e.g., by utilizing a ball bar calibration tool) and the results compared to prior results to determine whether accuracy has improved and by what amount. Testing and adjustment of the preload may be repeated in an iterative manner to further refine and optimize the accuracy with which the cutting head head 22 may be manipulated. Accordingly, embodiments of the coupler assemblies 42 described herein can advantageously enable particularly accurate drive systems.

Further, at any stage during the lifetime of a host system (e.g., example waterjet cutting system 10), the coupler assembly 42 may be readjusted or recalibrated in a same or similar manner to that described above. Accordingly, the coupler assemblies 42 described herein provide particularly versatile devices for ensuring highly accurate engagement of power transmission components in an efficient and repeatable manner.

Although discussed in the context of rack and pinion drive systems for waterjet cutting machines, it is appreciated that the coupler assemblies 42 and aspects of the same discussed herein can be applied to a wide variety of power transmission systems and methods wherein it is desirable to provide for adjustment of mating components to enable high precision alignment and coupling. For example, the coupler assemblies 42 or aspects of the same may be used to align power transmission shafts in rotational power transmission systems. In addition, the coupler assemblies 42 or aspects of the same may be used to provide highly accurate meshing of rack and pinion drive systems for other types of machines, such as, for example, milling machines and presses. Accordingly, embodiments of the present invention are not limited to waterjet cutting machines or the specific rack and pinion drive systems discussed herein.

Further, although the shapes and features of the floating mount 50 and clamp members 52, 54 are illustrated in a particularly compact form factor with symmetrical features and generally planar horseshoe shaped clamp members 52, 54, it is appreciated that the shapes and sizes of various features of the components can vary significantly while still providing the functionality described herein. For instance, the radius of curvature of the partial spherical bearing surfaces 80, 82 of the floating mount 50 and correspondingly shaped surfaces 84, 86 of the clamp members 52, 54 may vary based on numerous design parameters. In addition, the thickness of the flange 78 and other features may vary based on loading conditions and material selections. For instance, a floating mount 50 and clamp members 52, 54 machined, cast or otherwise formed of mild or high strength steel may vary in thickness, for example, from similar components made of aluminum, plastics or other materials having relatively lower strengths. Still further, the size, number and position of fasteners (and any respective holes) that may be used to couple the floating mount 50, clamp members 52, 54 and other components together may vary from application to application. Also, it is appreciated that other fastening mechanisms, such as, for example, toggle clamps or other clamps may be provided in lieu of threaded fasteners to connect the clamp members 52, 54 to the floating mount 50. Accordingly, one skilled in the relevant art will recognize that embodiments may be practiced without one or more of the specific details shown and described herein.

Moreover, the various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A drive system, the drive system comprising:
a rotatable shaft;
a pinion secured to the rotatable shaft;
a rack configured to mesh with the pinion; and
a coupling system, the coupling system comprising:
    a floating mount having a flange protruding from at least a portion of a periphery thereof, the floating mount having a central bore, the rotatable shaft coupled to the floating mount and extending through the central bore, and the floating mount being configured to support the pinion via the rotatable shaft and assist in aligning the pinion relative to the rack for operation; and
    a pair of clamp members movable between an unfastened configuration in which the floating mount is adjustably supported between the clamp members and a fastened configuration in which opposite surfaces of the flange of the floating mount are in direct contact with the clamp members to fixedly secure the floating mount between the clamp members, at least a pitch and a yaw of the floating mount being adjustable when the clamp members are in the unfastened configuration such that, during assembly of the drive system, the pinion is selectively movable with respect to at least two degrees of freedom, and the at least the pitch and the yaw of the floating mount not being adjustable when the clamp members are in the fastened configuration.

2. The drive system of claim 1 wherein, when the clamp members are in the unfastened configuration, the pinion is adjustably supported to have at least two angular degrees of freedom to optimize meshing alignment of teeth of the pinion with the rack.

3. The drive system of claim 1, further comprising:
a component driven by an interaction of the rack and the pinion, wherein the floating mount and the clamp members are coupled to the component and configured such that the floating mount and clamp members are selectively adjustable to mesh the pinion with the rack.

4. The drive system of claim 3 wherein the component is a portion of a movable bridge assembly having a machine tool attached thereto, the movable bridge assembly drivable with respect to a workpiece support surface by the interaction of the rack and pinion as the pinion rotates, the pinion supported relative to the rack at least by the floating mount and the pair of clamp members.

5. The drive system of claim 1 wherein the pitch of the floating mount is adjustable by at least ±5 degrees from a reference axis when the pair of clamp members are in the unfastened configuration and loosely engage the floating mount.

6. The drive system of claim 1 wherein the yaw of the floating mount is adjustable by at least ±5 degrees from a reference axis when the pair of clamp members are in the unfastened configuration and loosely engage the floating mount.

7. The drive system of claim 1 wherein the pitch and the yaw of the pinion are configured to adjust relative to the rack in response to the meshing of the rack and pinion.

8. The coupling system of claim 1, further comprising:
a plurality of fasteners to selectively move the clamp members between the unfastened configuration and the fastened configuration.

9. A drive assembly, comprising:
a rack;
a pinion;
a component driven by an interaction of the rack and the pinion; and
a coupler assembly between the pinion and the component to provide spatial adjustment of the pinion with respect to the rack, the coupler assembly including a floating mount and a pair of clamp members movable between an unfastened configuration in which the floating mount is adjustably supported between the clamp members and a fastened configuration in which the floating mount is fixedly secured between the clamp members, at least a pitch and a yaw of the floating mount being adjustable when the clamp members are in the unfastened configuration, and the at least the pitch and the yaw of the floating mount not being adjustable when the clamp members are in the fastened configuration.

10. The drive assembly of claim 9 wherein the floating mount and the clamp members are coupled to the component and are selectively adjustable to mesh the pinion with the rack.

11. The drive assembly of claim 9 wherein the component driven by the interaction of the rack and the pinion is a portion of a bridge assembly having a machine tool attached thereto such that the bridge assembly and machine tool are linearly movable with respect to a workpiece support surface.

12. The drive assembly of claim 11 wherein the machine tool is a cutting head of a waterjet cutting machine.

13. The drive assembly of claim 9 wherein the pitch of the floating mount is adjustable by at least ±5 degrees from a reference axis when the pair of clamp members are in the unfastened configuration and loosely engage the floating mount.

14. The drive assembly of claim 9 wherein the yaw of the floating mount is adjustable by at least ±5 degrees from a reference axis when the pair of clamp members are in the unfastened configuration and loosely engage the floating mount.

15. The drive assembly of claim 9 wherein the pitch and the yaw of the pinion are configured to adjust relative to the rack in response to the meshing of the rack and pinion.

16. The drive assembly of claim 9 wherein the floating mount of the coupler assembly has a flange protruding from at least a portion of a periphery thereof, the flange having a convex mating surface and an opposite concave mating surface for interoperating with correspondingly shaped surfaces of the clamp members to provide spatial adjustability of the floating mount when the clamp members are in the unfastened configuration.

17. The drive assembly of claim 16 wherein the convex mating surface and the opposite concave mating surface of the floating mount are partial spherical mating surfaces and interoperate with the clamp members when in the unfastened configuration to form a manipulable joint.

18. The drive assembly of claim 16 wherein each of the convex mating surface and the opposite concave mating surface of the flange of the floating mount has at least a partial spherical surface in which a center of the sphere defining the partial spherical surface is aligned with a central axis of the floating mount.

19. The coupling system of claim 16 wherein each of the convex mating surface and the opposite concave mating surface of the floating mount has at least a partial spherical surface in which a center of a sphere defining the partial spherical surface is approximately at a center of an engagement length of teeth of the pinion.

20. The drive assembly of claim 9, further comprising:
a plurality of fasteners to selectively move the clamp members between the unfastened configuration and the fastened configuration.

21. A method of meshing a rack and a pinion, comprising:
coupling the pinion to a floating mount, the floating mount having a flange protruding from at least a portion of a periphery thereof, the floating mount having a central bore, and the floating mount being configured to support the pinion and assist in aligning the pinion for operation;
clamping the floating mount insecurely between a pair of clamp members in an unfastened configuration such that at least a pitch and a yaw of the floating mount are adjustable and the pinion is selectively movable with respect to at least two degrees of freedom, the pair of clamp members being movable between the unfastened configuration and a fastened configuration in which the flange of the floating mount is fixedly secured between the clamp members and in which the at least the pitch and the yaw of the floating mount is not adjustable;
urging the pinion into meshing alignment with the rack while the floating mount is clamped insecurely between the clamping members in the unfastened configuration;
while maintaining the pinion in contact with the rack, clamping the floating mount securely between the pair of clamp members in the fastened configuration such that an alignment of the pinion is fixedly secured relative to an alignment of the rack; and
driving a component by an interaction of the rack and the pinion.

22. The method of claim 21, further comprising:
prior to urging the pinion into meshing alignment with the rack, attaching a counterbalance to the pinion.

23. The method of claim 22 wherein attaching the counterbalance to the pinion includes shifting a fulcrum of an assembly of all components that are supported by the pinion to substantially align with the rack.

24. The method of claim 21 wherein the urging the pinion into meshing alignment with the rack includes urging the pinion into meshing alignment with the rack via a ram.

25. The method of claim 21 wherein the clamping the floating mount insecurely between the pair of clamp members includes supporting the flange of the floating mount loosely between the clamp members.

26. The method of claim 21 wherein the clamping the floating mount insecurely between the pair of clamp members includes clamping the flange of the floating mount loosely between the clamp members, the flange having a convex mating surface and an opposite concave mating surface for interoperating with correspondingly shaped surfaces of the clamp members to provide spatial adjustability of the floating mount.

27. The method of claim 21 wherein the clamping the floating mount securely between the pair of clamp members includes tightening a plurality of fasteners to draw the clamp members tightly against the floating mount.

28. The method of claim 21, further comprising:
providing the rack and the pinion to drive a movable bridge of a multi-axis machine; and
adjusting an amount of preload between the pinion and the rack to optimize an accuracy with which an end effector of the multi-axis machine is manipulated in space by the movable bridge.

29. The method of claim 28 wherein the adjusting the amount of preload between the pinion and the rack includes establishing an initial amount of preload, testing the accuracy with which the end effector of the multi-axis machine is manipulated in space by the movable bridge and adjusting the amount of preload based at least in part on results of the testing.

\* \* \* \* \*